Aug. 24, 1943.                C. H. KLEIN                2,327,651
                        TAP-OFF CONNECTING DEVICE
                          Filed Dec. 15, 1941

INVENTOR.
CHARLES H. KLEIN
BY Hoodling and Kroet attys.

Patented Aug. 24, 1943

2,327,651

UNITED STATES PATENT OFFICE 2,327,651

TAP-OFF CONNECTING DEVICE

Charles H. Klein, Cleveland, Ohio, assignor to The National Telephone Supply Company, a corporation of Ohio Application December 15, 1941, Serial No. 423,025

2 Claims. (Cl. 287—75)

My invention relates in general to wire connecting devices and more particularly to a wire tap-off connecting device for connecting a tap-off wire to a line wire.

An object of my invention is the provision of a wire tap-off connecting device whereby the tap-off wire may be connected to the line wire without cutting the line wire.

Another object of my invention is the provision of a wire tap-off connecting device which may be connected to the line wire by compressing an engaging portion of the tap-off connecting device about the line wire.

Another object of my invention is the provision of making a wire tap-off connecting device in the form of a channel member having sides in the form of an ogee curve.

Another object of my invention is the provision of a good strong channel section between the portions of the wire tap-off connecting device which engage the tap-off wire and the line wire to insure that the tap-off wire engaging portion will not become broken off or bent with respect to the line wire engaging portion.

Another object of my invention is the provision of a wire tap-off connecting device which by the use of insert sleeves accommodates tap-off wires of variable sizes.

Another object of my invention is the provision of a tap-off wire connecting device whereby the end of the tap-off wire may extend through an opening in the tap-off connecting device to insure that the linesman has made a proper connection by inserting the tap-off wire completely within the tap-off wire engaging portion.

Another object of my invention is the process of making a tap-off connecting device by first producing a channel member and then bending the channel member in the form of an ogee curve.

Another object of my invention is the provision of making a wire tap-off connecting device by first extruding a stock of channel member and then cutting the stock of channel member into relatively short channel pieces and then bending the relatively short channel pieces in the form of an ogee curve to displace the line wire engaging portion and the tap-off wire engaging portion axially apart.

Another object of my invention is the provision of a channel member being substantially C-shaped in cross-section and giving a substantially constant radial gripping force about the line wire and the tap-off wire.

Other objects and a fuller understanding of my invention may be had by referring to the following description and claims, taken in conjunction with the accompanying drawing, in which:

Figure 1:
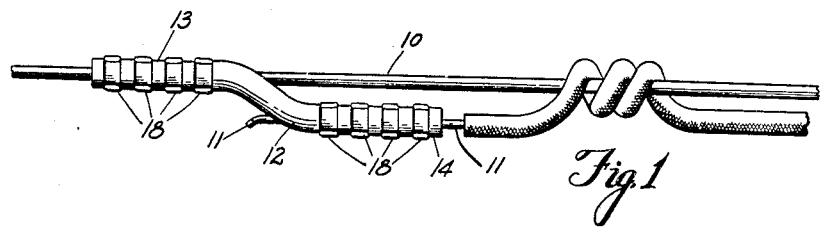
Figure 1 represents a view of a wire tap-off connecting device embodying the features of my invention and is shown in the completed installed condition.

With reference to Figure 1, the reference character 10 designates a line wire and the reference character 11 designates a tap-off wire which is arranged to be connected to the line wire by my tap-off wire connecting device. As illustrated, my tap-off connecting device comprises a central off-set portion 12, a line wire engaging portion 13 and a tap-off wire engaging portion 14. The line wire engaging portion 13 extends from one end of the central off-set portion 12 at an angle thereto and is compressible about the line wire to make a good connection. The tap-off wire engaging portion 14 extends from the other end of the central off-set portion 12 and is adapted to be compressible about the tap-off wire to make a good connection. Any suitable means may be employed to compress the line wire engaging portion 13 and the tap-off wire engaging portion 14 about the line wire 10 and the tap-off wire 11, respectively, so long as a good firm engagement is secured. As illustrated in Figure 1, I compress the line wire engaging portion 13 and the tap-off wire engaging portion 14 about the line wire 10 and the tap-off wire 11, respectively, by means of a constant movement compression tool having dies which when compressed about the tap-off connecting device makes localized and spaced depressed portions indicated by the reference character 18.

Figure 7:
Figure 7 shows the sleeve insert in Figure 6 mounted within the tap-off wire engaging portion and is held therein by compressing the tap-off wire engaging portion therearound.

The tap-off connecting device as shown in Figure 1 is the same as that illustrated in Figure 7 in that a hollow reducing sleeve 15 is employed to enable a small tap-off wire to be firmly anchored within the tap-off wire engaging portion 14. The hollow reducing sleeve 15 is provided with a longitudinal opening 16 to receive the small tap-off wire 11. The hollow reducing sleeve 15 may have openings of variable sizes in order to accommodate tap-off wires of variable sizes. The central off-set portion 12 is provided with an opening 17 so that the ends of the tap-off wire may extend therethrough in order to serve as an indication that the linesman has completely inserted the tap-off wire within the tap-off wire engaging portion 14. When the end of the tap-off wire extends through the opening 17 a positive indication is provided against the linesman failing to insert the tap-off wire fully within the tap-off wire engaging portion.

Figure 2:
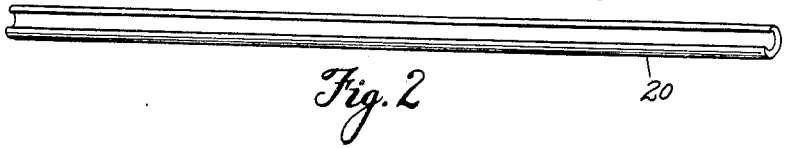
Figure 2 represents a section of a stock of channel member from which my wire tap-off connecting device is constructed.
Figure 3:
Figure 3 represents a piece of the channel stock after it has been cut off preparatory to processing same for making my tap-off connecting device.
Figure 4:
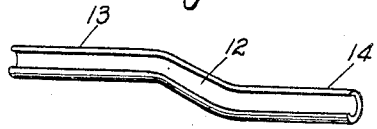
Figure 4 shows the next step in making my tap-off connecting device wherein the channel piece in Figure 3 has been bent in the form of an ogee curve.
Figure 5:
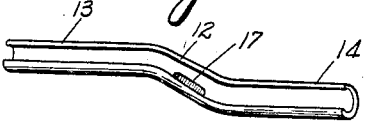
Figure 5 represents the next step in the forming of my wire tap-off connecting device wherein an opening has been provided in the off-set portion to receive the end of the tap-off wire.
Figure 6:
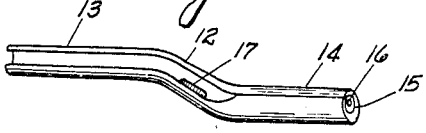
Figure 6 shows a sleeve insert which is adapted to be mounted within the tap-off wire engaging portion.

In making my tap-off connecting device I first extrude the channel member substantially C-shaped in cross-section such as shown by the reference character 20 in Figure 2. As illustrated, the radial thickness of the channel member is greater in the bottom of the channel than it is on the sides in order to give a substantially constant radial engagement gripping action after it is compressed about the line wire and the tap-off wire, respectively. The extruded stock in Figure 2 may be several feet in length and the next step in the making of my tap-off connecting device is to cut the extruded stock 20 into relatively short pieces as indicated in Figure 3 by the reference character 21. The next step in processing the tap-off connecting device is to bend or otherwise form the piece 21 in the shape of an ogee curve as illustrated in Figure 4, thereby producing the central off-set portion 12 and the line wire engaging portion 13 and the tap-off wire engaging portion 14. The next step is shown in Figure 5 wherein the opening 17 is made in the central off-set portion 12 to receive the end of the tap-off wire.

In the event that the tap-off wire is smaller than the line wire, the next step in the making of the tap-off connecting device as shown in Figure 7 is to mount a hollow reducing sleeve 15 within the tap-off wire engaging portion 14 and compress the tap-off wire engaging portion 14 therearound to hold it therein. The small tap-off connecting wire is then inserted within the opening 16 of the hollow reducing sleeve 15 until the end of the tap-off wire extends through the opening 17 after which the tap-off wire engaging portion 14 is compressed about the hollow reducing sleeve 15 and the tap-off wire. In the claims, the tap-off wire engaging portion 14 which is designated as the second engaging means or second engaging portion is described as being compressible about the tap-off wire to make a good connection. This designation in the claims also includes the provision when a hollow reducing sleeve is employed such as shown in Figures 1 and 7. In Figure 5, the tap-off engaging portion 14 may be left open as illustrated, or it may be partly closed so that when the tap-off wire is inserted in the partly closed portion, the wire will not escape sidewise therefrom.

Figure 8:
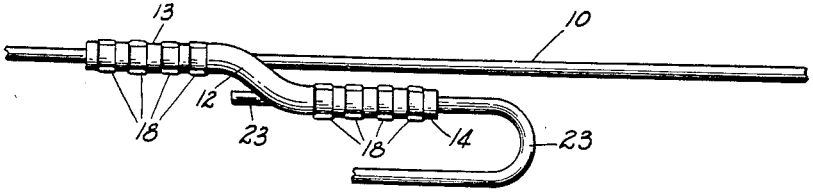
Figure 8 shows a view similar to Figure 1 except that the tap-off wire is substantially the same size as the line wire in which no hollow reducing sleeve is employed as in Figures 1 and 7.

In Figure 8 I illustrate an embodiment of my invention wherein the tap-off wire 23 is mounted directly within the tap-off wire engaging portion 14 without any hollow reducing sleeve. Therefore, in the claims, the second engaging portion or the second engaging means which refers to the tap-off wire engaging portion 14 and which is characterized as being compressible about the tap-off wire includes the embodiment both of Figures 1 and 8.

In my invention, the central off-set portion 12 is in the form of a channel and remains in that form after installation so that the tap-off wire engaging portion 14 is rigidly and strongly connected to the line wire engaging portion 13. That is to say, the central off-set portion being in the form of a channel gives a relatively high section modulus to insure against the tap-off wire engaging portion 14 becoming broken off or otherwise bent with reference to the line wire engaging portion 13. The hole 17 is placed directly in the bottom of the channel so that the high section modulus is not materially reduced to insure a good strong tap-off connecting device.

Another advantage from the hole 17 is that the end of the tap-off wire may be pushed therethrough for a considerable distance to present enough wire to anchor another wire, such for example, as a second tap-off wire thereto. This enables my connector to function as a device for fastening at least two tap-off wires to the line wire.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A wire tap-off connecting device adapted to slip over an uncut line wire for connecting a tap-off wire thereto comprising a channelled piece of metal having substantially parallel off-set end portions adapted to be compressible about the uncut line wire and the tap-off wire respectively and having an intermediate channelled connecting portion with substantially undistorted side walls to permit the uncut line wire to pass therebetween and with an apertured bottom wall to receive the tap-off wire.

2. A wire tap-off connecting device adapted to slip over an uncut line wire for connecting a tap-off wire thereto comprising a channelled piece of metal having a line-wire end portion and a tap-off wire end portion arranged substantially parallel to each other in an off-set relationship and adapted to be compressible about the uncut line wire and tap-off wire respectively and having an intermediate channelled connecting portion with substantially undistorted side walls to permit the uncut line wire to pass therebetween and with an apertured bottom wall to receive the tap-off wire, said tap-off wire end portion having a hollow reducing sleeve secured therein to receive a small tap-off wire.

CHARLES H. KLEIN.